Oct. 1, 1929.  H. A. RHODES  1,730,165
TRANSMISSION MECHANISM
Filed Sept. 25, 1920   8 Sheets-Sheet 6

Inventor
Harry A. Rhodes.
By Attorney

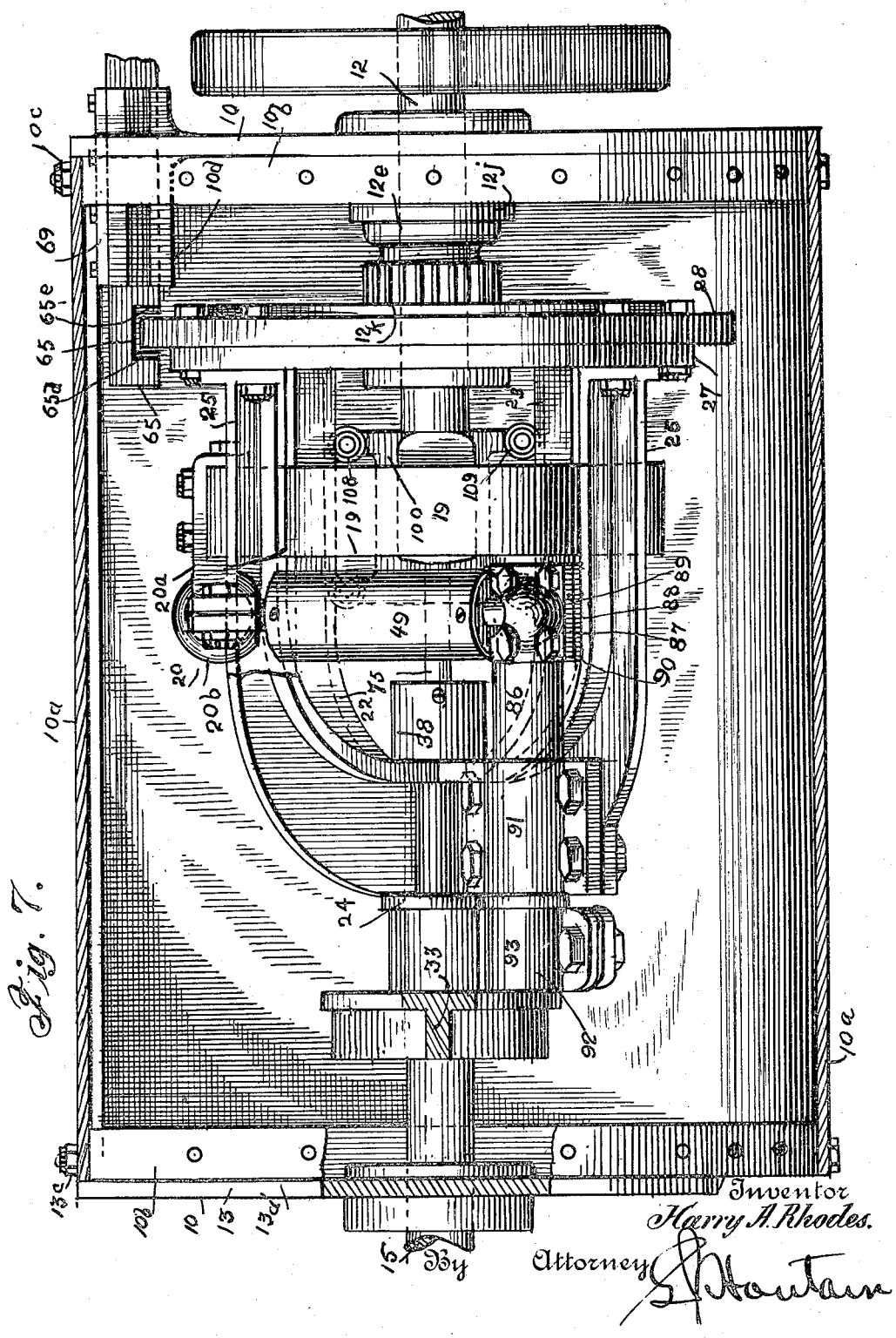

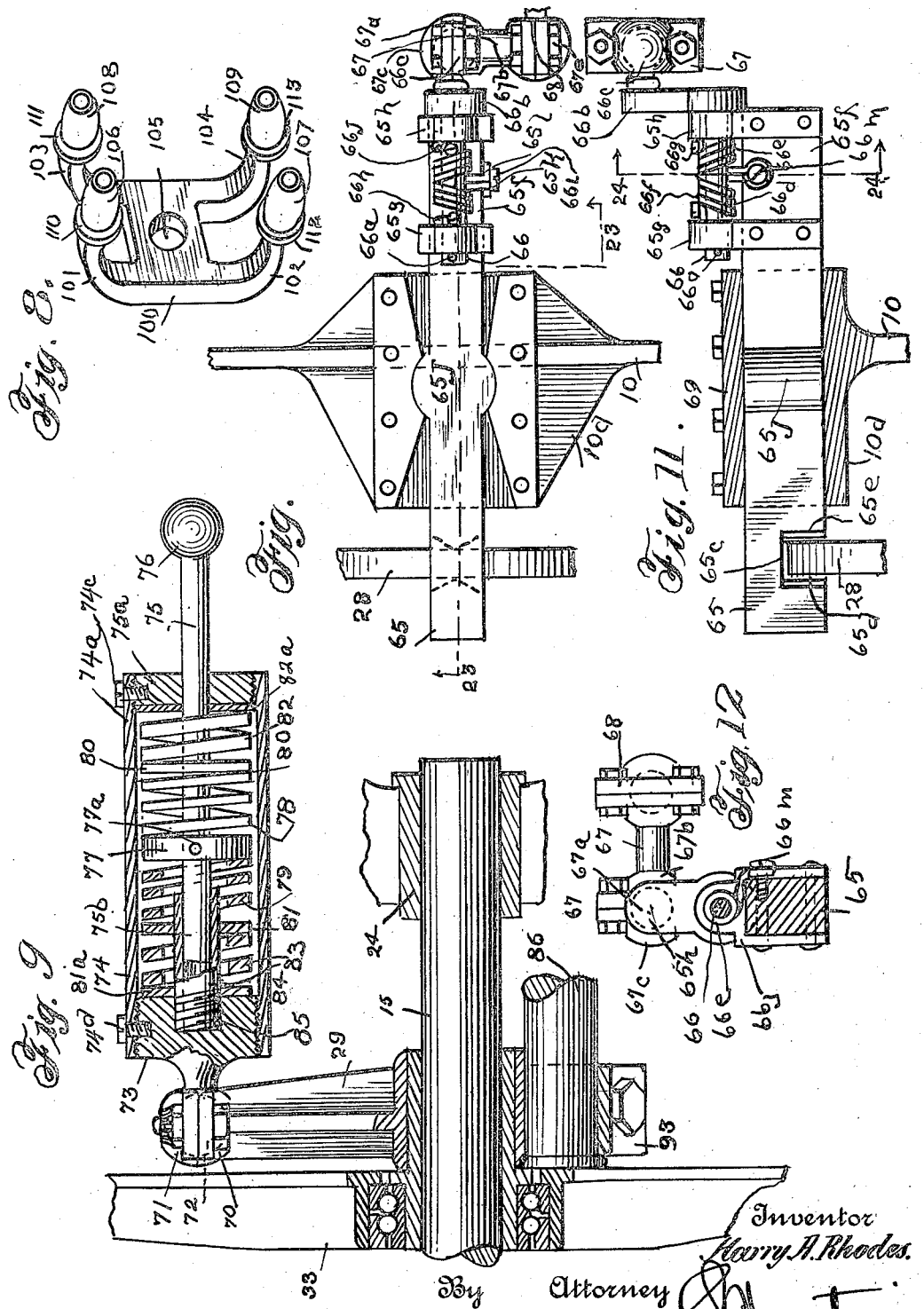

Patented Oct. 1, 1929

1,730,165

UNITED STATES PATENT OFFICE

HARRY A. RHODES, OF NEW YORK, N. Y., ASSIGNOR TO RHODES CORPORATION, A CORPORATION OF DELAWARE

TRANSMISSION MECHANISM

Application filed September 25, 1920. Serial No. 412,827.

The object of this invention is to provide an improvement in transmission mechanism over that shown in my United States Letters Patent 1,263,701, April 23, 1921.

Another object is to provide a more flexible transmission mechanism by which it is possible to rotate the driving shaft of the engine or motor, even though the mechanism to be operated be absolutely inert and immovable, and even though when rotating, the driven shaft or mechanism should suddenly come to a dead stop, without causing damage to the engine motor, transmission mechanism or other parts of the machinery.

Another object is to provide a transmission mechanism by which the driven shaft may be rotated in the direction of the driving shaft and at a variable speed or may be caused to rotate in the opposite direction from the driving shaft and at a variable speed, whether the driving shaft be rotated in one direction or another.

Another object is to provide a mechanism which may be used as a clutch for making a yielding or unyielding connection between the driving means and the driven means to take the place of clutches ordinarily in use, commonly called snipping clutches or positive clutches.

Another object is to provide a mechanism, which will be operable to limit the movement of a disk in one direction during the building up of power impulses by the transmission parts and which will be free to rotate when the mechanism is functioning normally.

When desired to impart or transmit power from the driving shaft through the transmission mechanism to the driven shaft, this may be accomplished by adjusting means whereby it is possible to incline a circular disc and its concentric annular members. When the said disk and the concentric annular members are thus inclined, relative to the driven shaft, the concentric annular member will either rotate with the disk or if held against rotation will be caused to vibrate, the vibrations being transmitted to the driven shaft in such a manner as to impart increased power, or torque, impulses to the driven shaft when an excessive load prevents said driven shaft from operating.

Referring to the drawings forming part of this specification, Figure 1 is a plan view of my transmission mechanism drawn to a reduced scale, showing it in a normal position so that no power can be transmitted thereby, the connecting parts of the motor and engine with which the transmission means is employed being broken away.

Fig. 7 is a fragmentary view in elevation of parts shown in Fig. 6.

Fig. 8 is a perspective view of the resilient retaining means.

Figure 1:
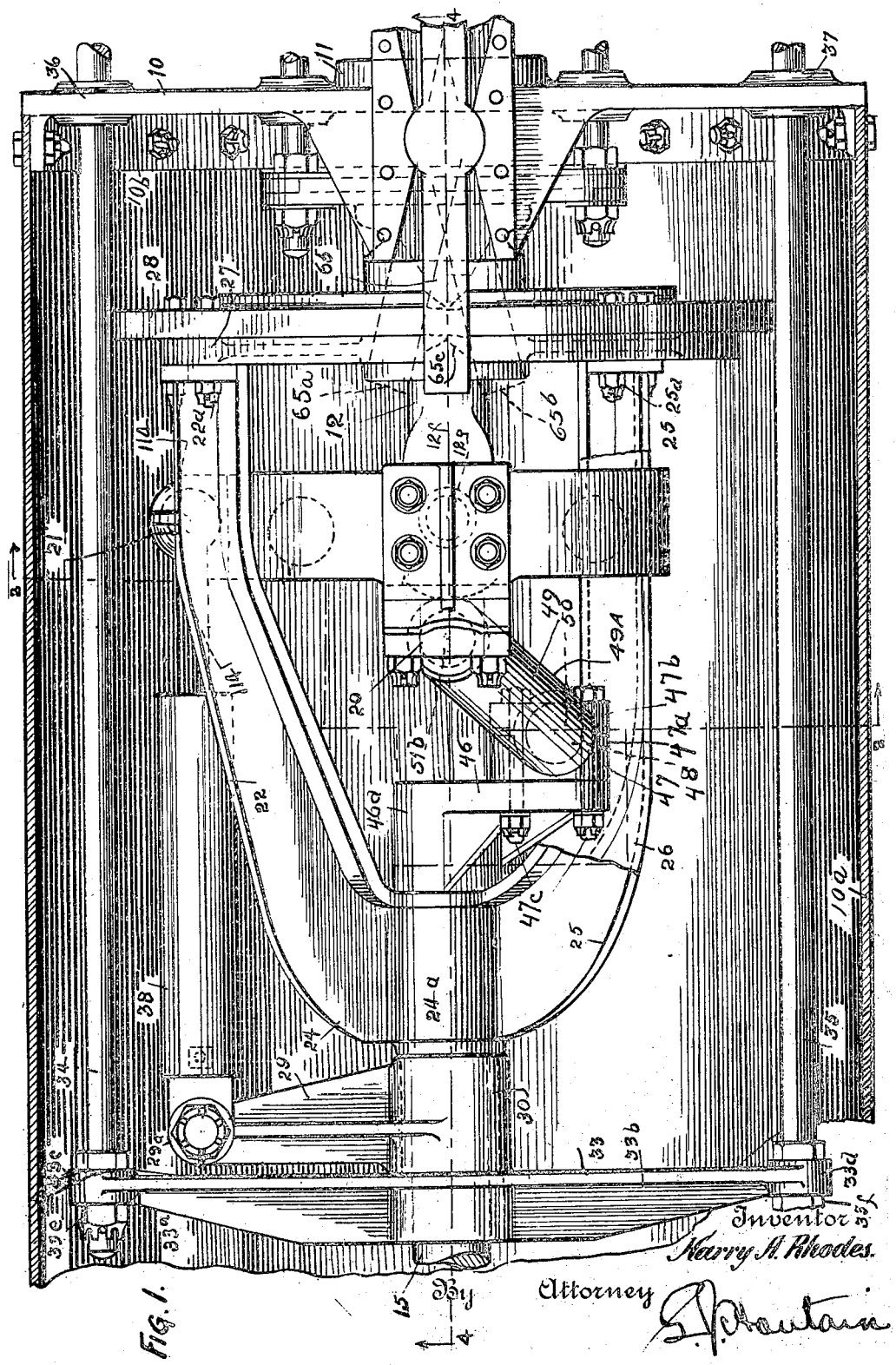

Figs. 9–12 inclusive are details of the device, Figure 10 in particular shows in detail the braking mechanism. In the drawings, numeral 10 indicates a bearing plate having bearings 11 in which the driving shaft 12 is journaled.

Figure 4:
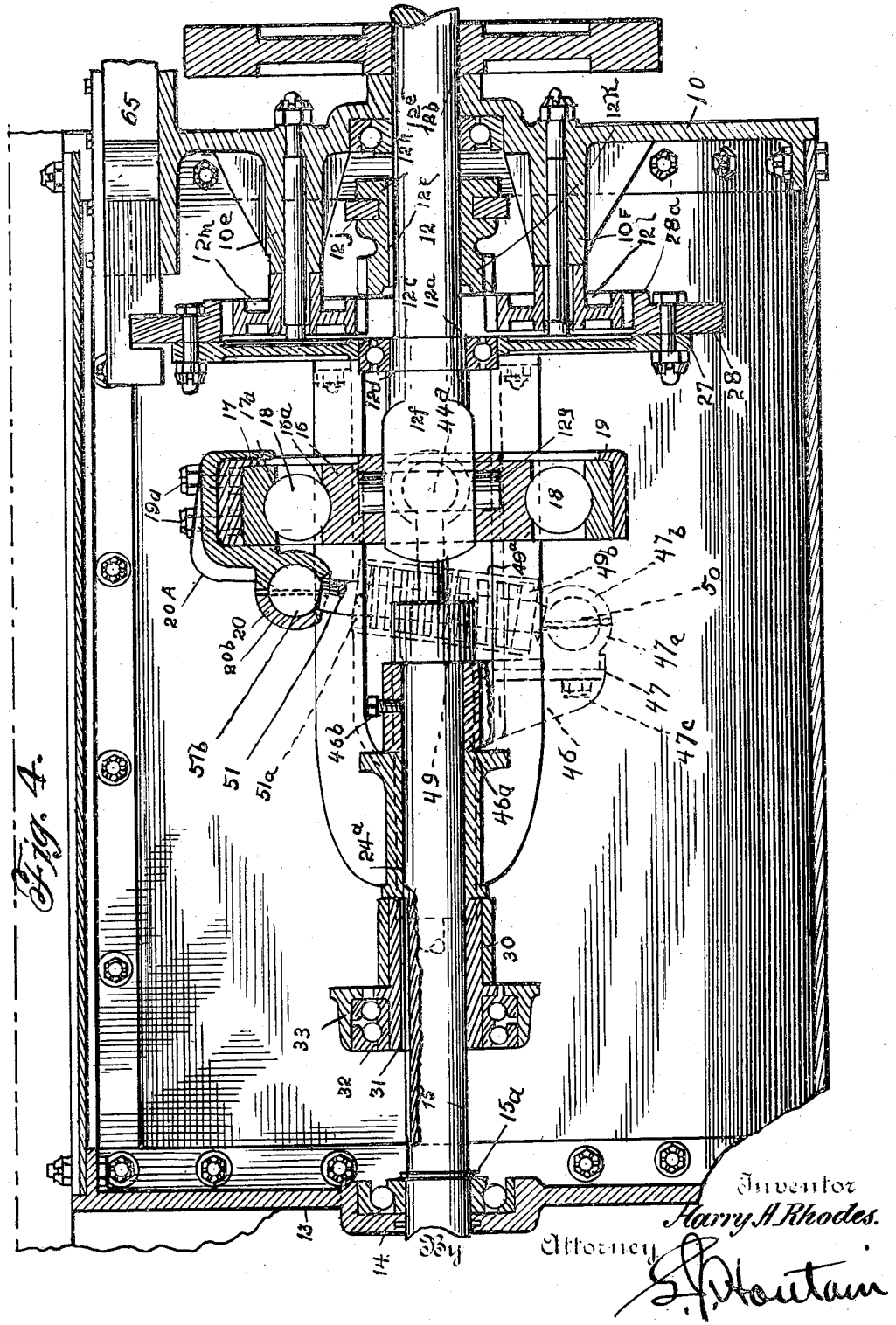
Fig. 4 is a vertical longitudinal sectional view taken on the line 4—4 of Fig. 1.
Figure 5:
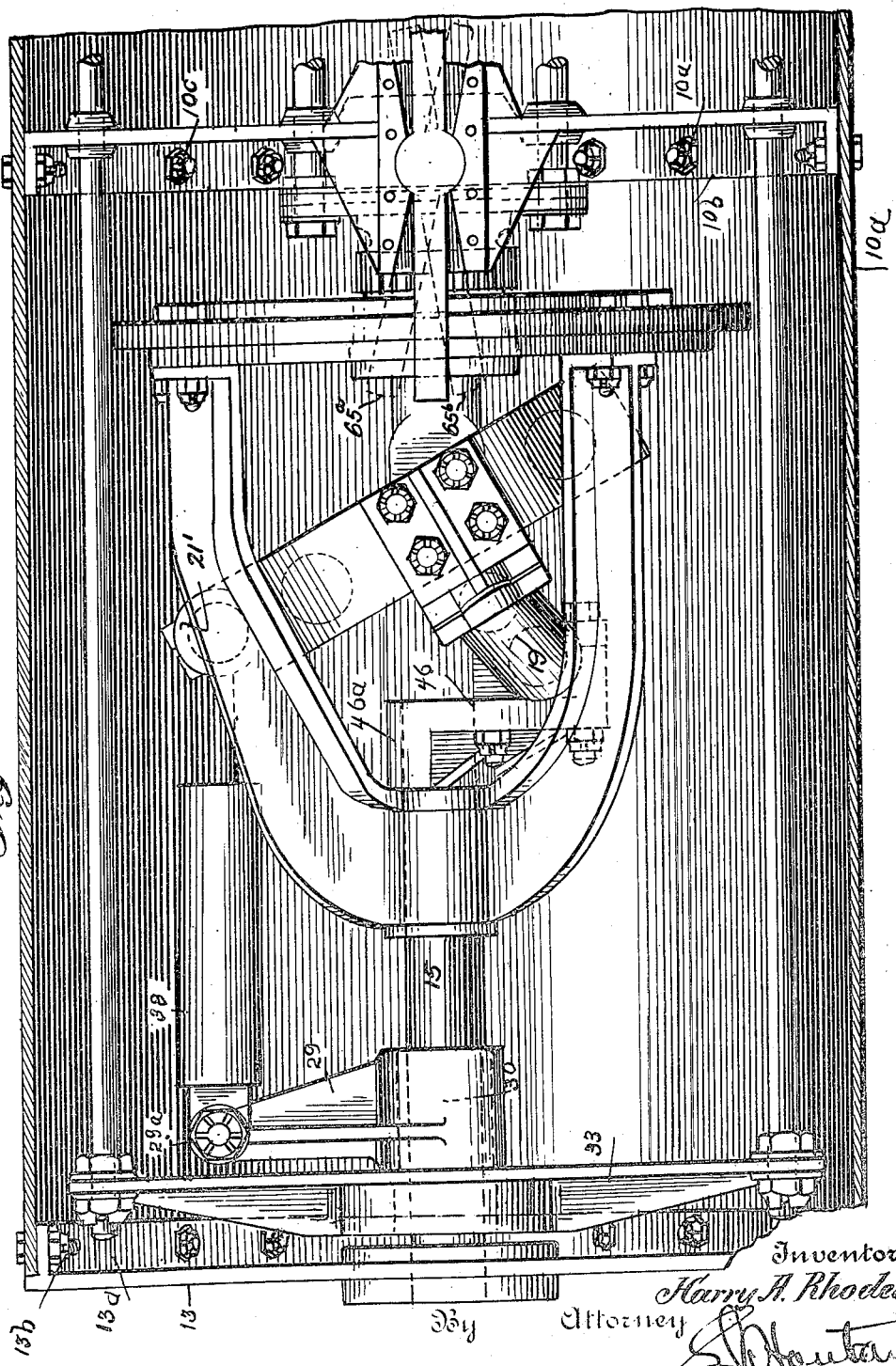
Fig. 5 is a plan view showing the adjusting means disposed in position so that the mechanism will exert its maximum power of transmission. The circular disk and concentric annular member being disposed at a maximum degree of inclination relative to the driving shaft.

In Figs. 4 and 5 of the drawings 13 indicates the bearing plate having bearings 14 in which the driven shaft 15 is journaled. The driving shaft 12 is connected to any suitable power delivering mechanism and is held against longitudinal thrust in either direction by the reduced portions $12^a$ and $12^b$ on the shaft which provides shoulders $12^c$—$12^d$ and $12^e$ which engage the bearings.

The driving shaft and the driven shaft are in longitudinal alignment and normally rotatable independently. The word normally is hereby employed to describe the machine when at rest and not adjusted to transmit power.

The end $12^f$ of the driving shaft 12 is rectangular in section and the bearing pin $12^g$ is disposed therethrough and in vertical position when the driving shaft and other parts of the mechanism are in the relative position shown in Fig. 4. A circular disk member 16 is pivotally held upon the rectangular end $12^f$ of the driving shaft 12 by the pin $12^g$ and the space within the disk 16 surrounding the portion $12^f$ of the shaft is great enough on either side thereof to permit inclination of the circular disk 16 thereon to an angle of substantially 20 degrees in either direction.

A circular annular member 17 is disposed concentrically around the circular disk 16 and is provided with an annular groove $17^a$ to correspond with a like groove $16^a$ formed in the peripheral surface of the disk 16. This combination together with the ball members 18 provide a commercial ball bearing member.

A ring member 19 is disposed externally around the annular member 17 and by means of bolts $19^a$ the socket member $20^A$ of the bolt and socket joint 20. is secured to said ring member. This socket member comprises two parts, $20^a$ and $20^b$ and bolts with the lock nuts are provided for securing parts of the socket together so that they may be readily assembled when disconnected in order to insert or remove the ball member of the joint when desired. On the ring 19 is an extension 21, reference being had to Figures 2 and 3, which serves as one of the mating parts of the socket member of the ball and socket joint, said socket member being made in two parts, $21^a$ and $21^b$. The part $21^b$ being removable and retained in position by bolts having lock nuts $21^c$. The mating parts $21^a$ and $21^b$ of the socket member are normally disposed on a horizontal line through the driving shaft and the center of the circular disk 16 at a right angle therewith.

The said disk 16 with concentric annular member 17 and parts thereof are disposed in a vertical plane intersecting the shaft 12 at a right angle therewith. The upper and lower portions $21^d$ and $21^e$ respectively of the socket members of the bearing or socket member $21^b$ and the ball and socket joint $21^a$ are disposed upon radii having a common center as at $21^f$ and indicated by dotted lines $21^g$ and $21^h$. When assembled this is to permit of a rocking, or tilting, motion of the circular disk 16 and the concentric annular members 17 and ring 19 when the pin $12^g$ in the driving shaft is disposed in a horizontal position and at the same time to cause the curved portions $21^e$ and $21^d$ to firmly engage the guide members 22 and 23 respectively above and below the said parts.

As above stated the circular and concentric members 16 and 19 respectively are pivotally held upon the rectangular portion of the driving shaft 12 and when the driving shaft is in a position so that the pin stands in a vertical position therethrough, the circular disk 16, annular member 17 and ring 19 may be deflected, to an angle of 20 degrees, reference being had to Figure 5, but when the shaft is turned so that the pin $12^g$ assumes a horizontal position, then the circular disk and its concentric members will be deflected from the vertical plane on the pivot coinciding with a line extending horizontally through the center of the shaft at right angle therewith. When this condition occurs, it will be observed that the bearing 21' of the ball and socket joint would be disengaged from the contacting surface of the guides 22 and 23, shown in Fig. 3, except for the curved upper and lower portions thereof as $21^d$ and $21^e$ just described, or if the surfaces were made flat instead of curved on the radii thereon from the center $21^f$ with the driving shaft 12 turned so that the pin $12^g$ is horizontally disposed and the disk and annular members 16 and 17 respectively are deflected at an angle with the shaft from the vertical plane, then the flat surface engaging the guides 22 and 23 would prevent the inclination or deflection of the disk and the annular members, but by the curvature provided, the bearing member of the ball and socket joint can freely turn between the guides 22 and 23 to accommodate required deflection or inclination of the disk and concentric annular members. The guide members 22 and 23, referred to, are a portion of the supporting member or spider 24, comprising four arms or braces, two of which form the guides 22 and 23 already described and the other two being designated as 25 and 26. This spider is keyed upon the driven shaft 15 as at $24^a$, Figure 4, and the extended arms or braces thereof are secured to a disk or plate 27 by the bolts provided with locking nuts as $22^a$, $23^a$, $25^a$ and $26^a$, Figure 2, respectively. The disk 27 is mounted upon ball bearings and an annular member 28 is firmly secured to the disk or plate 27 by the bolts $22^a$, $23^a$, $25^a$, $26^a$, so that the annular member 28 must rotate with the disk or plate 27 and also the arms or braces 22, 23, 25 and 26 of the bearing or spider 24. The guides 22 and 23 are arranged in parallel relation, as seen in Fig. 3 of the drawings, so that when the disk 16 and the concentric annular members thereon are inclined, as shown in Figure 5, contact will be insured for the bearing 21' of the ball and socket joints.

Figure 2:
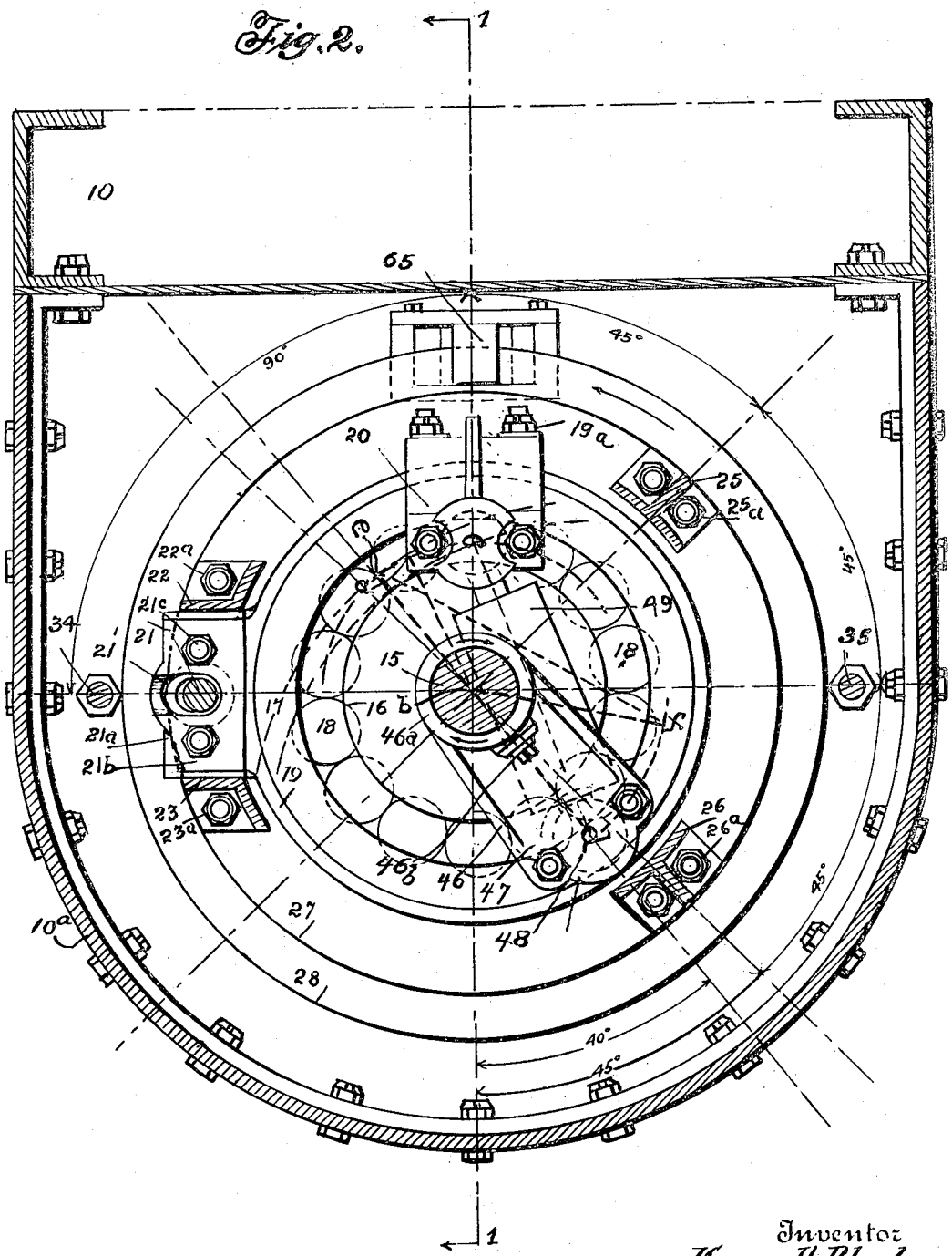
Fig. 2 is a transverse vertical section taken on the line 2—2 of Fig. 1.
Figure 3:
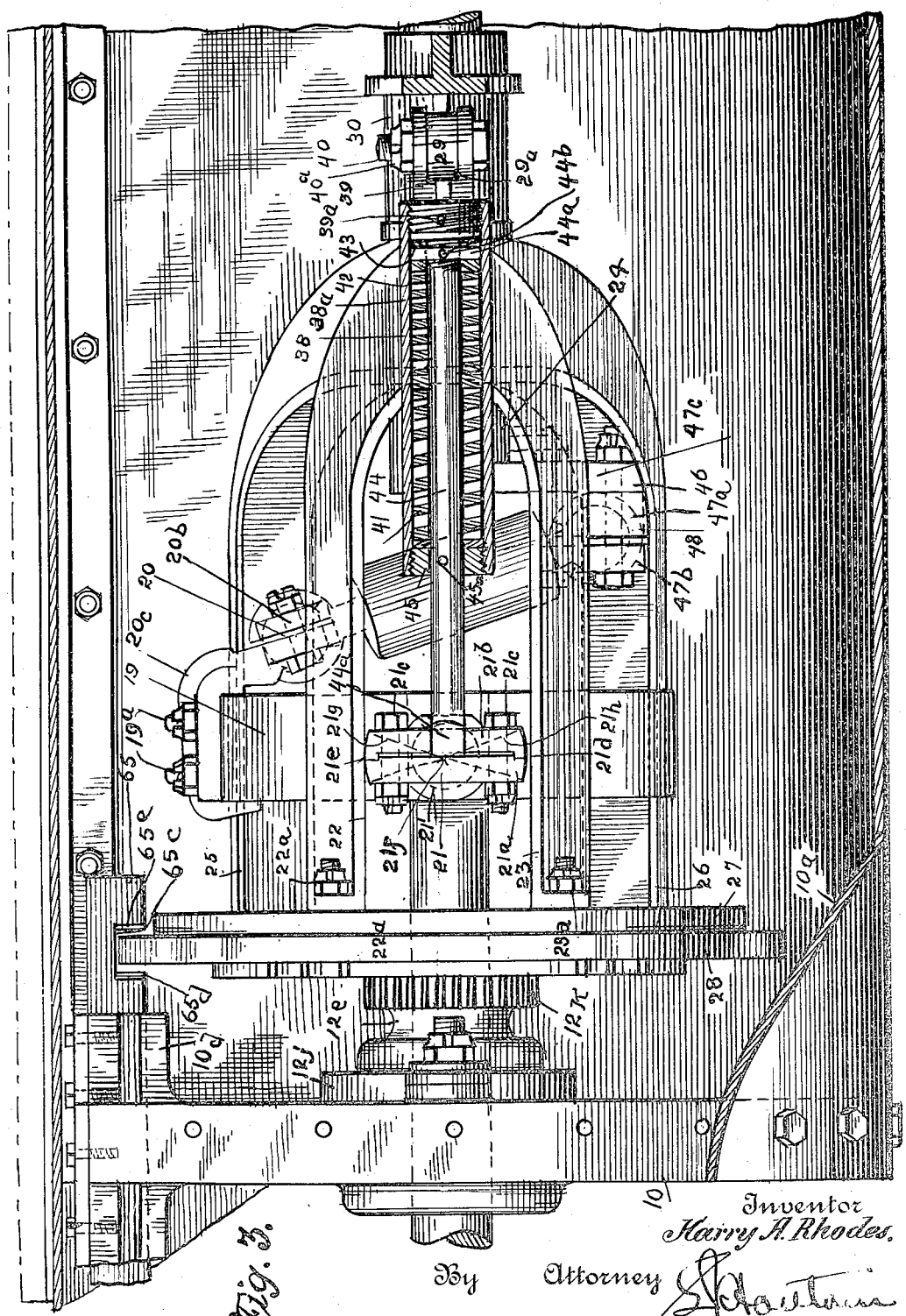
Fig. 3 is an elevation taken from the rear showing the mechanism in its normal position, certain features of the adjusting means being illustrated therein.

Thus it will be seen that when the parts of the transmission mechanism are in the normal position, as shown in Fig. 1 of the drawings, also in Fig. 2, Fig. 3 and Fig. 4 thereof, the driving shaft may rotate carrying with it the circular disk 16, while the concentric annular members 17 and 19, the spider 24 and the arms or braces thereof 22, 23, 25, 26, the disk member 27 and the circular plate 28 connected therewith and the driven shaft to which the spider is keyed, as at 24ª are all stationary or at rest This is made possible by the disposition of the balls 18 in the grooves 16ª of the circular disk 16 and 17ª of the concentric annular member 17, whereby the circular disk 16 may freely rotate with the driving shaft, while the concentric annular member 17 and the ring member 19 and all parts or members, connected therewith are at rest.

The means employed for connecting the parts described which are supported upon the driving shaft 12 for transmission of power from the driving shaft through the circular disk 16, the annular member 17 and the outer annular member 19 with the driven shaft 15 will now be described.

The crank arm 29 is formed upon the sleeve member 30, see Figures 1, 3, 4 and 5 of the drawings, and is rotatable with the shaft 15 and longitudinally slidable thereon. The sleeve member 30 has an extension 31 upon which are supported ball bearings 32, and a cross head 33, having the oppositely disposed arms 33ª and 33ᵇ, is supported upon the ball bearings 32, whereby the driven shaft 15 and the crank arm 29, the sleeve 30 and extension 31 may freely rotate with the driven shaft independently of the cross head 33, but both the crank arm 29 and the cross head 33, are so constructed that while the crank arm rotates independently of the cross head, yet it can slide longitudinally upon the driven shaft 15 with the cross head 33. This arrangement admits of an independent rotary movement of the crank arm and the cross head and a simultaneous sliding movement of the crank arm with the cross head, to provide for the longitudinal adjustment of the cross head 33 and the crank arm 29. Seats are provided in the ends of the arms 33ª and 33ᵇ of the cross head as 33ᶜ and 33ᵈ. Parallel rods 34 and 35 are disposed longitudinally within the frame in parallel relation with the driving shaft and the driven shaft and the ends thereof are secured in the seats 33ᶜ and 33ᵈ of the arms of the cross head 33 by lock-nuts 33ᵉ and 33ᶠ. The said rods are extended through seats 36 and 37 in the bearing plate 10 and are slidably held therein. The extended ends of the rods 34 and 35 (not shown) are connected with hand reverse or other mechanical means by which a desired adjustment can be effected to regulate the position of the cross head 33 and the crank arm 29 longitudinally upon the driven shaft 15. The seat 29ª is provided at the end of the crank arm 29 as a bearing for a spring adjusting means 38 having a bifurcated bearing portion 39 adapted to engage the bearing 29ª of the crank arm 29 and when in position it is secured by a pin 40 and a lock-nut thereon 40ª. The spring adjusting means 38 includes a tubular element 38ª in which springs 41, 42, and 43 are disposed for exerting tension for the purpose of regulating the position and action of the rod 44 slidably disposed centrally within the tubular member 38ª and provided with a head as 44ª, which is threaded thereon, and held in position by a pin 44ᵇ, which prevents the head 44ª from becoming unthreaded from the rod. The rod is disposed through a collar member 45, which is threaded into one end of the tubular member 38ª, while the bearing member 39 is threaded into the opposite end of the tubular member. A pin 39ª is provided to prevent the member 39 from being unthreaded from its seat in the tubular member and similar lock means 45ª may be provided for preventing the collar member 45 from being unthreaded from its seat in the opposite end of the tubular member. The rod 44 extends outwardly a distance beyond the collar member 45 and a ball 44ª is formed thereon for engaging within the socket member on bearing 21, hereinbefore described. The rod 44 is of such a length that when the mechanism is disposed in the position shown in Figures 1, 2, 3 and 4 of the drawings, in which the sleeve 30 of the crank arm 29 is in contact with the sleeve or journal 24ª of the spider or support 24, there will be no tension on the springs 41, 42 and 43 of the spring adjusting means 38, so that the circular disk 16 and the concentric annular members 17 and 19 carrying the ball and socket bearing 21 in which the ball member 44ª is held, will maintain the position shown in the drawings, that is in a vertical plane at a right angle with a line passing through the longitudinal center of the driving shaft 12. It will be observed that by the longitudinal adjustment of the cross-head 33 by the parallel rods 34 and 35 held therein, the position of the crank arm 29 and the spring means 38 held thereon, will be regulated so that the circular disk 16 and the concentric annular members 17 and 19 will be accordingly inclined upon the driving shaft, as shown in Fig. 5, affording a desired angle of adjustment of said circular disk and concentric members with relation to the driving shaft upon the pivotal bearing 12ᵍ. Referring to Fig. 1 and the views projected therefrom as Fig. 2, Fig. 3 and Fig. 4 the crank arm 46 is provided with a sleeve or journal 46ª and is fixedly keyed or splined upon the end of the driven shaft 15 adjacent the rectangular end of the driving shaft 12, so as to be rotatable with the driven shaft. The driven shaft 15 is held against longitudinal thrust in either direction by the sleeve 46ª of the crank 46 and the set-screw 46ᵇ at the end thereof and by the shoulder 15ª provided in the shaft where it is journaled in the bearing plate 13. The crank arm 46 is formed to provide a bearing 47 for the ball and socket joint 48 Fig. 1, comprising the mating members 47ª and 47ᵇ forming the socket member of the ball and socket joint or bearing 47 of the ball and socket joint 48. The member 47$^b$ is secured in position by the bolts and lock-nuts 47$^c$. Spring controlling means 49, which will be referred to hereinafter as the crank spring, are employed for providing a yielding or resilient connection between the crank arm 46 and the annular concentric element comprising the disk 16 and the annular concentric members 17 and 19 on the disk 16. The crank spring 49 is constructed in all respects substantially the same as the adjusting spring or means 38, with the exception that the ball member 50, Fig. 4, of the ball and socket joint 48 is threaded into one end as at 49$^b$ of the tubular member 49$^a$ of the crank spring 49 and the rod 51 which is disposed slidably in the collar 51$^a$ threaded into the opposite end of the tubular member 49$^a$ is shorter than the rod 44 of the adjusting spring 38. The ball 51$^b$ is formed on the end of the rod 51 and is disposed within the socket member 20, hereinbefore described.

Referring to Fig. 2 of the drawings, the function of this spring member 49 will be disclosed. The crank arm as will be seen, is disposed at an angle of substantially 45 degrees with a vertical plane passing through the center of the driving shaft and the driven shaft, while the line passing through the center of the ball and socket joint 48 and the ball and socket joint 20 is at an angle of substantially 23 degrees. It will be seen that the ball and socket joint 20 revolves in a circle and the crank spring 49 serves as a link for connecting the end of the crank arm 46 and the annular member 19 so that when the latter is caused to vibrate or to move in a circular direction around the driving shaft 12, crank spring member 49 will lift the crank arm 46 so as to move or tend to move said crank arm correspondingly in a circular direction around the driven shaft 15.

If however, at any time, the resistance to the rotation of the driven shaft or the load to be carried thereby is greater than the resistance of the crank spring 49 so that the crank arm cannot move correspondingly with the annular member 19, the crank spring will yield under the load, thereby increasing the distance between the ball 50 of the joint 48, and the ball 51$^b$ of the joint 20.

This distance between the ball and socket joint 20 and the ball and socket joint 48 is relatively increased at various intervals in the operation of the mechanism by the varying inclination of the annular member, relative to the driving shaft and under the varying conditions as various positions of adjustment are afforded by the adjusting means herein described and the consequent result or effect upon the position of the annular members 17 and 19 during the rotation thereof around the driving shaft as inclined by the adjusting means 38 and the crank spring 49.

When the member 16 is in vertical position (see Figures 3 and 4) the driving shaft will rotate with said member within the annular member 17 freely, but when the crosshead is moved thereby through its connection operating to tilt the member 16 on its pivot, the annular member 17 will be carried with member 16 by reason of the fact that the balls will function as wedges between the raceways and a force will be imparted to the crank arm 46 which will tend to move the driven shaft 15. Should an abnormal load be sufficient to hold the driven shaft against the stress imparted by the driving shaft directly to the member 16 and acting upon the annular member 17, this will cause the whole device which is termed the clutch to be thrown into co-axial relation with the driving shaft which position will however be only maintained for an instant, since as soon as the rotation of the member 16 has made approximately one-half a revolution, the recoil of the spring member 38 will act to return the clutch members to their inclined position in non-coaxial relation to the driving shaft, after which the aforesaid act will be repeated providing the resistance of the driven shaft is maintained, also the recoil of the crank spring 49 will tend to rotate the annular member 17 and the driven shaft in the reverse direction to that of the driving shaft.

It can be seen that the driving shaft will continue to revolve without damage to the driven shaft or parts thereof.

Every impulse thus imparted through the circular disk 16 from the balls 18 in a rotary direction, while exerting a torque impulse to the annular members will also tend to restore said annular members to the normal position and thereby exert a tension upon the spring member 38. If the adjustment spring member has sufficient tension to resist this impulse tending to restore the mechanism to the normal position, then the torque impulse imparted through the circular disk and the ball bearings 18 will be transmitted to the annular members 17 and 19 and they will be caused to rotate around the driving shaft carrying with them the adjusting spring member 38 and bearing connections thereof and the crank spring 49, the crank arm 46 and driven shaft 15 thereby imparting rotation to the whole driven mechanism.

My invention, therefore, includes a fly wheel, the momentum energy of which is stored, or conserved, in resilient means, when the load is excessive and which may be exerted upon the driving shaft and thence transmitted to the driven shaft, as the load upon the driven shaft increases under adverse road conditions or from any increase in the load to be carried by the driven shaft, thus relieving the direct strain upon the engine or motor due to variable road conditions or to a variable load upon the driven shaft and insuring a more even transmission of power to the driven shaft and the wheels of a car. As an illustration of the manner in which this principle will function, we will assume that the load to be carried by the driven shaft suddenly becomes so great that the driven shaft cannot be directly or continuously rotated by the driving shaft and that the adjusting spring member 38 will yield sufficiently to permit the mechanism to be intermittently restored to the normal position thereby permitting the driving shaft to rotate independently of the driven shaft. While this condition prevails the speed of the fly wheel $12^h$ will be accelerated and its kinetic energy or momentum will thus be increased and stored in the fly wheel to be exerted upon the driving shaft. If the adjusting spring member 38 at its position of adjustment is not sufficient to transmit the power necessary to cause the driven shaft to rotate thereby utilizing all of the energy transmitted from the engine through the driving shaft, the adjusting means may be employed so as to incline the transmission mechanism, including the annular members 17 and 19 to a greater degree of inclination, as for example, to bring it to a third position or fourth position or even to a fifth position or to whatever position necessary to insure sufficient resistance, so that the rotary impulse transmitted through the circular disk and the ball bearing means to the annular members will prevail, as against the tendency or impulse thereto to restore the transmission means to the normal position, thereby retaining the transmission mechanism at some degree of inclination from the plane at right angles with the driving shaft and insuring the rotation of the annular members 17 and 19 and the crank arm 46 and the driven shaft 15, so as to impart rotation thereto.

Referring to Fig. 1, Fig. 2, Fig. 3 and Fig. 5 of the drawings, it will be seen that the circular plate 28 is rotatable on the journal of the driving shaft 12 and is rotatable thereon with the spider 24, the guides 22 and 23 and the arms 25 and 26 thereof and that the spider 24 is rigidly keyed to the driven shaft 15, so that when a rotary movement is imparted to the spider from any means or to the driven shaft 15 as through the crank arm 46, the circular plate 28 with the spider 24, the driven shaft 15 and the crank arm 46 will rotate on their journals respectively. It will be observed that the arms of the spider 24 as 22 and 23, 25 and 26 are extended in the direction of the bearing plate 10 and that they pass beyond the end of the driving shaft 12 on which the circular disk 16 and the annular members 17 and 19 are pivotally held and extend to the circular plate 27 and the ends of the arms thereof are securely bolted to the circular plate 27 and 28 and that the circular plate 27 and 28 is adjacent the bearing plate 10 of the mechanism.

The locking or braking means 65 employed for regulating the operation of this mechanism, is supported upon a bracket $10^a$ on the bearing plate 10 and is adapted for engaging the circular plate 28, so as to grip the same when desired to retard or completely stop the motion thereof. The locking member 65 is movably held in the bracket $10^a$ of the bearing plate 10, in such a manner that it may be reversably disposed to the right or the left of the line through the longitudinal center of the driving shaft as indicated by the dotted lines in Fig. 1 and Fig. 5 designated as $65^a$ and $65^b$. With reference to Fig. 3, it will be seen that there is a recess or notch $65^c$ adapted for engaging the peripheral edge of the circular plate 28. The lower surface of the locking member 65 is supported upon the bracket $10^a$ on a plane a slight space below an uppermost portion of the circular plate 28, so that when the locking member is in a position in the bracket $10^a$, the recess or notch $65^c$ will be in position for engagement with the circular plate 28. By referring to Figs. 1 and 3, it will be seen that when the locking member is in longitudinal relation parallel with the driving shaft, that it is not on the circular plate 28 as shown by the dotted lines in Fig. 1. That when the locking member is disposed to the right or the left as shown in dotted lines as at $65^a$ and $65^b$, the circular plate is engaged by the jaws of the locking members $65^d$ and $65^e$. Any suitable manually controlled means may be employed for controlling the locking means 65, so that it may be disposed in a neutral position as indicated in solid lines in Fig. 1 and Fig. 5 or in an oblique position to the right or to the left of the longitudinal center line as indicated by the dotted lines $65^a$ and $65^b$ and when so held in the inclined position it serves alternately to regulate the direction of rotation of the driven shaft 15, the spider 24 and the circular disk 28, so that the rotation thereof will be in a corresponding direction with the driving shaft or in the reverse direction therefrom. It is contemplated that the locking member will be yieldingly held in inclined position for controlling the direction of the rotation of the driven shaft to that of the driving shaft and the operation and application thereof is as follows:—Assuming for example, that the driving shaft is to be rotated in the position from the right to the left as hereinbefore described in the explanation of the views in the drawings, in that case the locking means 65 will be inclined to the position indicated by the dotted line $65^a$ and yieldingly held in that position, so that the surfaces of the jaws, $65^d$ and $65^e$ will oppositely engage the sides of the circular plate 28 when the locking means has been moved in the lateral direction far enough so that the jaws thereof contact with the plate on both opposing surfaces of the plate. It cannot be moved any farther in that direction and the frictional contact of the surfaces of the plate with the engaging jaws thereof would prevent the rotation of the circular plate in the direction of the inclination of the locking member from the longitudinal center line thereof, but when force is exerted to rotate the circular plate 28 in the opposite direction, that is to say in the direction of the arrow shown in Fig. 2, the frictional contact of the opposing surfaces of the circular plate 28 with the jaws 65$^d$ and 65$^e$ will tend to incline the locking member 65 to the neutral position, parallel with the longitudinal center line of the mechanism and to release the contact of gripping force of said jaws from the edge of the circular plate. This makes it possible for the circular plate 28 to rotate freely in the direction indicated by the arrow in Fig. 2, but if at any time an impulse is transmitted through the mechanism from any cause to rotate the circular plate in the opposite direction, the frictional contact of the circular plate with the jaws of the locking means will immediately cause the jaws to impinge forcibly against the opposing surfaces of the plate to retard its rotation in the direction in which it is being driven by the mechanism. The locking means will prevent the circular plate 28 from reversing its movement and moving in the opposite direction in the manner described above and so the circular plate, the spider, the crank arm and the driven shaft, although they may be momentarily retarded or stopped from rotating at the same relative speed as the driving shaft in corresponding direction therewith, cannot move or rotate in the reverse direction, because the locking means engage the rim of the circular plate 28 and holds it until the position where the impulse exerted by the springs as 38 and 49 would tend to reverse the rotation thereof, has been passed and the driving shaft, the pivotal bearing pin and the circular disk 16 have advanced again to a position in the course of their rotation, where the impulse exerted thereby will cooperate with the said spring members to impart rotation to the annular members, the crank arm, the driven shaft, the spider and the circular plate 28 in a corresponding direction with the driving shaft. This clearly explains how the driven shaft may be caused to rotate in the corresponding direction with the driving shaft.

We will now explain how the locking means is employed as a reversing means to reverse the rotation of the driven shaft, so that it will rotate in a reverse direction, to which the driving shaft is being rotated. Assuming that the driving shaft is still rotating in the direction indicated by the arrow in Fig. 2 or from right to left and that it is desired to reverse the direction of rotation of the driven shaft, so that it will rotate in the opposite direction from the driving shaft, the locking means is manually moved to the reverse position of inclination indicated in dotted lines as 65$^b$, when the jaws of the locking means 65$^d$, 65$^e$ are brought into engagement with the opposing surfaces of the circular plate 28, at the opposite position of inclination from that which has just been described. Now if the driving shaft is rotated and the tendency of the transmission mechanism is to impart a corresponding rotation to the driven shaft and the spider and the circular plate 28, the frictional force of the jaws of the locking member, will tend to cause the jaws of the locking member to forcibly grip the opposing surfaces of the circular plate and retard or prevent a rotation thereof in the corresponding direction with the driving shaft. The result of this is as follows:—the circular plate, the spider, and the driven shaft are held against rotation until the driving shaft and the circular disk have rotated a sufficient distance to pass the positions hereinbefore described when as above explained the tendency of the spring members 38 and 49 respectively is to cause the annular members 17 and 19 to move in a rotary direction opposite from the direction of the driving shaft, thereby causing the crank arm 46 and the driven shaft 15 to rotate in the opposite direction as the locking member 65 when thus adjusted serves to prevent the circular plate, the spider and the driven shaft from rotating in a corresponding direction with the driving shaft. Whenever the impulse imparted from the driving shaft through the circular disk 16 is to rotate the driven shaft in the corresponding direction therewith, that impulse is counteracted by the force of the locking member 65 and the driven shaft is prevented from rotating in that direction and held against movement until the successive impulse is imparted by means of the spring members 38 and 49 to cause the annular members 17 and 19 and the crank arm 46 and the driven shaft 15 to rotate in the reverse direction from the direction in which the driving shaft is being rotated.

When the driving shaft is rotated at any considerable speed and the locking means is thus adjusted to insure rotation of the driven shaft in the opposite direction, the impulses produced by the mechanism tending to rotate the driven shaft in the opposite direction from the driving shaft, which are transmitted to the driven shaft by the mechanism, will occur at such frequent intervals that the rotation of the driven shaft in the opposite direction will be substantially continuous and the driven shaft will rotate in the opposite direction from the driving shaft.

The action of the transmission mechanism and the various parts thereof, that is to say the circular disk and the annular members and the adjusting spring member 38 and the crank spring member 49 will function in a cooperative manner to impart the rotation to the driven shaft in the reverse direction, so that the circular disk and annular members will be deflected from the normal position parallel with the vertical plane intersected by the driving shaft at right angles therewith and conversely to permit the circular disk and annular members to be restored to the normal position parallel with said plane and precisely in the same manner as described hereinbefore, when it is assumed that the driven shaft was being rotated in the corresponding direction with the driving shaft and when the locking means was disposed in such a position of adjustment, as to insure a rotation of the driven shaft in a corresponding direction with the driving shaft.

Now assuming another condition, for example, if the direction of the rotation of the driving shaft is reversed while the locking means is disposed, as just described, then the impulses imparted from the driving shaft through the transmission mechanism will cause the driven shaft and the crank spring 49 and the crank arm 46, the annular members 17 and 19, the spider 25 and the circular plate 28 and all other connected parts to rotate in the corresponding direction with the driving shaft, although the direction of the rotation of the driving shaft has been reversed.

In Fig. 4 of the drawings and other views thereof, I have shown means for transmitting power from the driving shaft to the driven shaft independently of the transmission means hereinbefore described, and which will be briefly explained as follows: The clutch member of the clutch mechanism $12^h$ is slidably keyed upon the driving shaft 12 and the clutch member $12^j$ is disposed within an annular groove around the peripheral surface of the clutch member $12^h$ at one end thereof and a gear as $12^k$ is provided at the opposite end thereof and the pinions $12^L$ and $12^m$ are journaled in bearings or brackets $10^e$ and $10^f$ on the bearing plate 10 and are freely rotatable thereon and engage within an internal gear $28^a$ formed in the inner peripheral surface of the circular plate 28; and when the circular plate is rotated through the agency of the transmission mechanism, hereinbefore described, and the crank arm 46, the driven shaft 15 and the spider 25, Figures 1 and 2, which is secured thereto, as at the ends of the arms 22, Figure 3, or the ends of the braces or guides as 22 and 23, Figure 3 and the braces 25 and 26, in Figure 2, these pinions $12^L$ and $12^m$ are rotated thereby upon their respective journals $10^e$ and $10^f$. In Fig. 4 the clutch member $12^h$ is disposed in a position of adjustment, so that while it rotates with the driving shaft 12, it is not in mesh with the pinions $12^L$ and $12^m$ but when moved longitudinally on the shaft toward the said pinions, the teeth of the gear $12^j$ on the clutch member $12^h$, are thrown into an engagement with the teeth of the pinions $12^L$ and $12^m$ so as to be in mesh therewith. Then the pinions $12^L$ and $12^m$ will both rotate in the opposite direction from the direction in which the driving shaft has been rotated and the circular plate 28 having the internal gear therein $28^a$ will be caused to rotate in the same direction as the pinions and in an opposite direction from the direction in which the driving shaft is being rotated and at a corresponding speed therewith, that is the driven shaft which is connected with the circular plate 28, carrying the internal gear $28^a$ by means of a spider 25, which is secured thereto will be caused to rotate in the opposite direction from the driving shaft and at a suitable speed therewith, without the aid of the reversing means hereinbefore described, including the locking member 65.

When the clutch mechanism is employed to engage the pinions so as to rotate the circular plate 28 by means of the internal gear therein $28^a$ so as to drive the driven shaft thereby, the locking member 65 should be disposed so as to permit the free rotation of the circular plate 28 in the direction of rotation imparted through the clutch gear $12^h$ and the pinions $12^L$ and $12^m$ to the said gear $28^a$ and the circular plate 28, which may be done by shifting it to the internal position, as shown in solid lines in Figs. 1 and 5 of the drawings or at the position of inclination as hereinbefore described, for example, either $65^a$ or $65^b$, which will afford the free rotation of the circular plate in the direction induced by said clutch and pinions.

In case it is desired to dispense with the use of the transmission mechanism, embodying the circular disk 16 and the annular members 17 and 19 and the adjusting spring 38 and the crank spring 49, etc., the means just described embodying the clutch and the pinions actuated thereby, may be employed and can be used in connection with the clutch mechanism hereinbefore described, so as to rotate the circular plate 28, the spider 25 and the driven shaft 15, either in corresponding direction with the driving shaft or in an opposite direction therefrom; or in place of employing such additional ordinary reversing mechanism, if an engine or motor is employed which will admit of the direct reversal of the driving shaft; then the driving shaft may be reversed directly by the means provided in such engine or motor.

When the transmission mechanism is being operated in this manner by use of the gearing means just described, including the gear $12^k$ of the clutch $12^h$ and the pinions $12^L$ and $12^m$ meshing with the internal gear $28^a$ of the circular plate 28 for driving the driven shaft, it will be noted that the car is being driven at low speed and high power and the driven shaft will be rotated at a resultant speed relative to the driving shaft, but in case road conditions or load conditions are such that a higher power or lower speed or vice versa is required, then the clutch member $12^h$ will be released from engagement with the pinions $12^L$ and $12^m$ and the locking means 65 will be set so as to insure the rotation of the circular plate 28, the spider 25 and the driven shaft in the desired direction and the driving shaft may continue to rotate at its previous speed or at a more suitable speed of rotation and the resilient transmission mechanism hereinbefore described, embodying the circular disk 16 and the annular members 17 and 19 held on the pivotal bearings $12^g$ together with the spring adjusting means 38 and the crank spring 49 and the crank arm 46 will be employed as hereinbefore described for transmitting the power from the driving shaft to the driven shaft at a suitable speed to accommodate the conditions of the road or the load to be moved and the power developed by the engine or motor and exerted through the driving shaft.

It should be further observed that at any time when the car is stopped and it is desired to keep up the power of the engine or motor, if the car has been operating on the gearing transmission by means of the clutch $12^h$ and the gear $12^k$, then when the car is stopped the clutch is shifted to release the gear $12^k$ from engagement with the pinions $12^L$ and $12^m$ and the resilient transmission mechanism, by means of the adjusting means provided, including the crank arm 46, is employed for disposing the resilient transmission mechanism in the normal position, that is to say so that the circular disk 16 and the annular members 17 and 19 will be disposed in parallel relation with a vertical plane intersecting the driving shaft at right angle therewith when as hereinbefore explained the driving shaft with the pivotal bearing and the circular disk 16 may rotate freely independently of the annular members 17 and 19, so as to conserve the power of the engine or motor in readiness for starting the car, when it is desired to permit the driven shaft and other mechanism for driving the car thereby to be at rest.

In Figures 10, 11 and 12 the details of construction are shown of the means for adjusting the locking member 65, so as to hold it yieldingly in either position desired, as indicated by the dotted lines $65^a$ and $65^b$, Figures 1 and 5, which comprises a crank shaft 66, held rockingly on the end of $65^f$ of the locking means 65 in bearings $65^g$ and $65^h$. The crank shaft is held against longitudinal displacement by any suitable means as a pin $66^a$ through one end thereof and is retained in a position so that the crank arm thereof as $66^b$ is disposed in a vertical plane. The crank arm $66^b$ is yieldingly retained in the vertical plane by spring means, which may be of any preferred form, but are indicated in the drawings as helical springs $66^d$ and $66^e$, being wound in opposite directions as right and left. One end of each spring respectively as $66^f$ and $66^g$ is secured by set screws $66^h$ and $66^j$ or other suitable means to the shaft, while the opposite ends thereof as $66^k$ and $66^L$ are secured by the set screws $66^m$ or other suitable means to the end $65^f$ of the locking member 65. Any force applied to the end of the upright crank arm $66^b$ will tend to move the lever in either direction to the right or the left respectively, but when the member 65 reaches the limit of its movement, a resilient force will be exerted for retaining the member in said position, if the upright arm is carried slightly beyond the center line of the member 65, the spring members will yield sufficiently so that the jaws of the locking member as $65^e$ and $65^d$ will not grip the circular plate 28 with sufficient force to prevent the rotation thereof in the desired direction, but in a yielding manner so that the continuous rotation thereof in the desired direction will not be impeded or prevented. On the end of the crank arm $66^b$ a fitting may be provided as $66^c$ for connecting the controlling means, by which the locking means may be manually moved into the desired position. A convenient and practical form of connection would be to provide the ball bearing joint connected with an arm or link as 67, which in turn is pivotally held to the end of the lever 68, having the ball bearing socket thereon as $67^a$ comprising the member $67^b$ formed integrally with the link 67 and the mating member of the socket $67^c$, which are held in position for engagement of the ball $66^c$ by the bolts $67^d$ and $67^e$.

This arrangement of the ball and socket joint as $67^a$ for connecting the link 67 with the fitting $66^c$ of the crank arm $66^b$ affords a universal joint movement, whereby the arm of any ordinary lever mechanism can be suitably connected with the crank arm $66^b$, of the crank shaft 66.

By the means just described, it will be seen that the resilient controlling and adjusting means of the locking and reversing means as 65 is provided.

The locking member 65 may be subjected to excessive strain in regulating and controlling the operation of the transmission mechanism and therefore should be of strong construction. To meet this requirement I have provided for pivotally holding the locking member 65 in the bracket support $10^a$, as follows:—The recess is provided in the bracket $10^a$, adapted to receive the enlarged portion $65^j$ of the locking member 65, which serves as a pivotal bearing for the locking member 65. The walls of the recess being curved to fit closely with the curved surfaces of the enlarged bearing portion 65ʲ, Fig. 10, of the locking member, which will be seen by referring to Fig. 3, is of a dimension so that the upper surface thereof when it is in position in the bracket is substantially on a plane with the upper surface of the bearing plate and bracket 10ᵃ. Threaded bores are provided in the upper portion of the walls of the bracket member 10ᵃ as 65ʰ, and the plate 69, see Figs. 7 and 10, having corresponding openings therein, is superposed upon the top portion of the walls of the bracket approaching the locking member 65 and secured in this position by screw bolts as 69, thus securely retaining the locking means within the bracket support, in such a manner that it may be reversibly swung around the pivotal central portion in the horizontal plane and is positively held against any movement in any other direction as upward or downward, neither can it be moved from its normal position and held against any force tending to twist or overturn the locking member 65 from its normal position within the bracket support.

Referring to Figure 9 explanation will be made of a modification of the adjusting spring member 38 for connecting the annular member 19 and the crank arm 29. In the Fig. 9 crank arm 29 is shown with a ball bearing socket 70 and mating part therefor 71 for securing the ball 72 of the ball bearing joint. Said ball being formed on a threaded plug 73, which is threaded into a tubular member 74, which serves as a casing for the rod 75 on the end of which is provided the ball 76, which serves as a ball member of the ball and socket joint 21' hereinbefore described. The threaded collar member 75ᵃ surrounds the rod 75 and is threaded into the open end 74ᵃ of the tubular member 74. A collar 77 is keyed as at 77ᵃ or otherwise suitably secured upon the rod 75 and a spring as 78 of moderate resisting force disposed around the rod adjacent one side of the collar 77 and a similar spring 79 is disposed around the rod adjacent the opposite side of the collar 77. A washer as 80 is disposed against the opposite end of the first spring 78 and the washer 81 is disposed around the collar adjacent to the opposite end of the spring 79, a heavier and stronger spring 82 is disposed against the washer 80, and a similar spring 83 is disposed around the ends of the rod adjacent the washer 81. A tubular member 84 is threaded into a bore in the plug 73 as at 85 and is adapted to telescopically receive the end 75ᵇ of the rod 75. When the parts above described are assembled around the rod 75, the rod with said members thereon is inserted in the open end 74ᵃ of the tubular member 74 and the end of the rod 75ᵇ is disposed within the short tubular member 84, then the threaded collar 75ᵃ is seated in the open end 74ᵃ of the tubular member 74 and secured by set screw as 74ᶜ or by any suitable means against accidental displacement therefrom. A similar set screw or other suitable means 74ᵈ is employed for securing the bearing plug 73 within its respective end of the tubular member 74. It will be seen that when the parts are in the assembled relation just described, the spring members 82 and 83 will engage respectively against the threaded collar 75ᵃ and the threaded bearing plug 73. Washers 82ᵃ and 81ᵃ are provided there-between to receive the wear. Washers 80 and 81 are disposed against the opposite ends of the springs 82 and 83 respectively to receive the wear incident to contacting or impacting against the springs 78 and 79 and said springs in like manner impinge against the opposite sides of the collar 77. The object of this arrangement is to provide a yielding connection between the crank arm and the annular member 19, which will counteract any tendency to jar or cramp the spring mechanism, when parts thereof are moved in either direction incident to the vibratory movement of the annular member 19. If the annular member is moved to a greater distance than the normal, from the crank arm 29, then the spring 78 will yield to its limit and if the movement continues beyond that point, then the spring 82 will sustain the strain beyond that point yieldingly but with increased resistance to the movement of the annular member 19 of the mechanism. Conversely, if the annular member 19 moves relatively nearer to the crank arm than the normal position, the spring 79 will first receive the strain and yield to its limit. If the movement continues beyond that point, then the stronger spring 83 will receive the strain and yield, but with greater resistance to the movement. This arrangement will insure an easy and noiseless operation of the spring member at all times and without strain upon the mechanism or cramping of the spring mechanism and the rod 75 within the tubular member 74, as would be the case unless some provision were made for the thrust of the rod inwardly when under excessive strain.

The crank spring member 49, Figure 4, is constructed entirely in precisely the same manner as the adjusting spring member 38 just described, with the exception that the rod as 51, having a ball member 51ᵇ of the ball bearing joint 20, is shorter and of the same length as shown in the other views of the drawings. The ball bearing joint is provided in the form of the adjusting spring, just described, as shown in Fig. 9, in order to allow a universal joint movement at the point where it is connected with the crank arm 46, Fig. 1, for reasons, which will be explained hereinafter.

Figure 6:
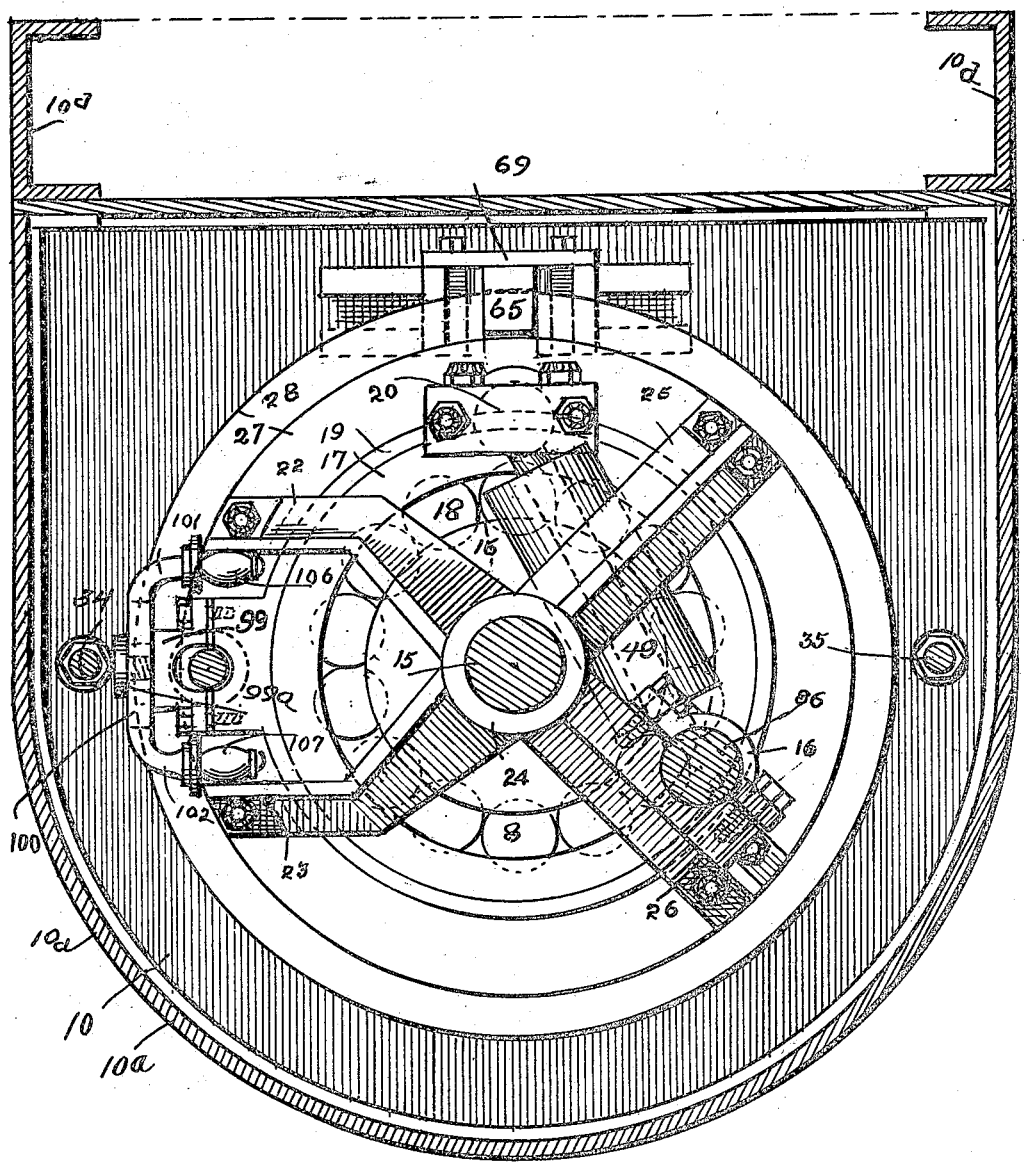
Fig. 6 is a sectional view on a transverse plane illustrating certain modifications of construction.

In Figures 6, 7 and 8, I have shown a modified form of the retaining means for the crank spring for the purpose of admitting of longitudinal adjustment of the ball bearing joint connecting the crank spring with the crank arm of the driving shaft. Referring to Figs. 6 and 7, 15 indicates the driven shaft, 24 indicates the spider, 22 and 23 respectively the guides or braces and 25 and 26 the opposing braces. The crank arm 46 is dispensed with in this form of the device and the crank spring member 49 is connected to a sliding bearing member 86 by the ball bearing joint 87, comprising the socket member 88 and the mating member 89 secured by the bolts 90, to retain the ball member of the joint therein. The bearing member 86 is a rod slidably held in the journal or bearing 91 which is supported around the arm 26 and the spider 24 and extending therethrough. The extended end thereof as 92 is rigidly held in the end of the crank arm as 93, which corresponds with the crank arm 29 and is rigidly held in relation therewith and at a suitable angle relative thereto, being slidably keyed upon the driven shaft 15, so that when the crank arm 29 is moved along the driving shaft longitudinally thereof by the adjusting means, hereinbefore described, the crank arm 93 will move along accordingly thereby imparting corresponding longitudinal movement to the bearing member or rod 86 slidably held in the journal bearing 91. When the mechanism is in the normal position as shown in Figs. 1, 2, 3 and 4, by this arrangement the bearing member 86 is so disposed that the ball bearing joint 87 is adjacent the annular member 19 and the crank spring member is in the vertical plane parallel with the said annular member, but when the adjusting means is used to dispose the crank arm 29 in such a position as to effect an inclination of the annular member 19 from the normal position, then with the modified form shown in Figs. 6 and 7, the crank spring member 49 is inclined from the vertical plane and the ball bearing connection thereof with the bearing member 86 is moved a corresponding distance from the normal position as is the ball bearing joint 21' and in a corresponding longitudinal direction therewith. This affords greater tension upon the crank spring 49 when the transmission mechanism is greatly inclined, so as to exert a great degree of power, and comparatively minimum tension when but slightly inclined from the normal position so as to produce a slight degree of power. It also permits of setting the annular members and in a horizontal position relative to the driving shaft and a vertical plane.

To provide greater flexibility and thereby to reduce friction at such times as the circular disk and annular member are inclined from the normal position as when the pin 12$^s$ is co-axial with the ball bearing 21' and at which time the crank spring 49 exerts an influence to incline the disk and annular members from the vertical plane at a right angle with the driving shaft causing a rocking movement of the bearing between the guides 22 and 23 as shown in Fig. 3 of the drawings. I have provided a modified form of means for retaining the ball bearing 21 centrally between the said guides 22 and 23, which is shown in Figs. 6 and 8. In these views the guides as 22 and 23 are placed at a slightly greater distance one from another and a stud 99 is provided upon the fixed member of the ball bearing socket 21'. A bridge member 100 having arms 101, 102, 103 and 104 and a bore 105 centrally thereof is mounted upon the stud 99 and secured in position by a lock nut as 99$^a$. The arms of this bridge member 100 are curved on an arc of a circle to substantially a right angle with the body thereof and when it is mounted upon the stud 99, the arms extend inwardly toward the driving shaft. The rollers as 106, 107, 108 and 109 are rotatably mounted upon the ends of said arms and flanges 110, 111, 112 and 113 are provided at the base of the rollers so that when the rollers engage the inner surfaces of the guides 22 and 23, the flanges will engage the edge surface thereof and thereby prevent the rollers under any circumstances from moving inwardly relative to the said guides 22 and 23 toward the driving shaft. The socket members of the ball bearing 21' in this form of device do not contact with the guides 22 and 23, but are a considerable distance removed therefrom leaving a clearance between said guides and the members of the ball bearing socket and the parts are normally held in this position. The bridge 100 and the arms thereof 101, 102, 103 and 104 are of resilient material, preferably finely tempered steel of great strength, so that when force is exerted through the driving shaft and the circular disk 16 to rotate the annular members 17 and 19 and the ball bearing connection 21' and cause it to move in a rotary direction, a resilient force will be exerted by the arms and the bridge members respectively, as the lower arms 102, 104 or the upper arms 101 and 103 impinge against the brace with which the rollers thereon are in contact. The result of this movement is that the arms yield sufficiently to permit the spring member 49 to exert its force upon the crank arm 46 or the bearing member 86 as shown in Figs. 6 and 7 and thereby impart rotary motion to the driving shaft, which carries with it simultaneously the spider 24, of which the guides 22 and 23 form an integral part thereof. As the guides 22 and 23 move in a rotary direction with the annular member 19 and the ball bearing connection 21', the temporary stress exerted upon the arms of the bridge member 100 and the rollers thereon is relaxed and the greater part of the strain and stress of rotating the driving shaft is sustained by the crank spring member 49. The rollers 106, 107, 108 and 109 reduce the friction by providing a rolling contact with the guides 22 and 23 and afford free movement of the ball bearing connection incident to the inclination of the circular disk 16, and the annular members 17 and 19 relative to the vertical plane intersecting the driving shaft at a right angle therewith in the differential position thereof, between the normal position and the maximum position of deflection.

It will be seen that the movement of this ball bearing connection 21 together with the bridge member 100 with the rollers 105, 106, 107 and 108 provided on the arms thereof is in an arc of a circle, described on a radius with the axis of the pin $12^g$ as its center. It will be seen from the plan views of the mechanism in Figs. 1 and 5 of the drawings that the outer edges of the guides 22 and 23 are curved slightly at the point of contact with the socket members of the ball connection therewith by the dotted lines in Figs. 1 and 3 as 114—114. It will be obvious that the edge surfaces of the guides 22 and 23 where the flanges 110, 111, 112 and 113 contact therewith may be described by a radius of a circle having the axis of the pin $12^g$ as its center, thus insuring a constant contact of the flanges with the edge surfaces of the guides. As the bridge 100 is journaled rotatably upon the stud 99, it will be seen that the slight rotary movement of the bearing connection with relation to the bridge member 100 is unimpeded when the circular disk and the annular members 17 and 19 are inclined from the vertical plane at a right angle with the driving shaft when the said pin is in co-axial relation with the ball bearing connection 21' and the bearing stud 99 of the bridge member 100.

It does not seem necessary to multiply views to show the guide members 22 and 23 drawn in solid lines in the manner just described. Furthermore the flanges 110, 111, 112 may be dispensed with and in that case the slight differentiation of the rollers relative to the contiguous edges of the guide members 22 and 23, will be of no consequence as the ball bearings 101, 102, 103 and 104 may extend inwardly a greater or less distance, relative to the respective contacting guides as their position may be changed by the greater or less deflection of the circular disk and the annular members and the ball bearing connection 21' relative to the normal position.

In the foregoing description of the invention particular emphasis may be laid upon the operation of the transmission mechanism and the variable speed mechanism whereby the device may be adjusted for transmitting a variable degree of the power developed by the engine or motor and for the automatic release of the driving shaft from the driven shaft, so that the driving shaft may rotate at a relatively higher speed than the driven shaft and so that the driving shaft may continue to rotate, although the driven shaft may come to a stop so as not to rotate. However, I desire to call attention to the fact that the device may be employed for establishing a positive and unyielding connection between the driving means and the driven means, in which my mechanism is used without recourse to the gearing means shown and described in connection with the device.

This positive connection may be established between the driving means and the driven means in the following manner: When it is desired to establish a rigid connection between the driving means and the driven means, the adjusting means will be thrown to an extreme position of adjustment whereby the pivotal transmission element will be held at substantially its maximum degree of inclination, so that to restore it to the normal, the connection with the spring adjusting means will have to move so that an arc of a circle extending over a greater distance than is admissable by the degree of compression afforded by the spring adjusting members and the crank spring connection between the driving and the driven means, so that as the pivotal member moves toward the position at right angles with the driving shaft, the movement thereof reaches a point where the limited movement or compression of the spring members will prevent it from further movement in that direction. Then a continued rotation of the driving shaft will result in a consequent rotation of the driven shaft for the reason that restricted movement of the spring members prevents the pivotal members from returning the entire distance from its maximum degree of inclination to its normal position in a vertical plane at right angle with the driving shaft and therefore, so long as the pivotal member is disposed at any considerable degree of inclination from the normal position, it will be caused to rotate correspondingly with the driving shaft. Thus it serves as a rigid clutch for insuring the rotation of the driven shaft with the driving shaft, when it is desired to employ the mechanism for this purpose.

While I have thus described the specific form of my transmission mechanism substantially as shown in the drawings, I do not wish to be understood that I limit myself thereto or that the mechanism is limited to the use of driving automobiles or tractors of any type, as it is contemplated that it may be employed with any kind of mechanism by which power is generated or developed or utilized for operating machinery as steam engines, gas or gasoline motors, electric motors or generators or by wind or water power and many forms of the device may be devised and applied without departing from the objects, the principles and the scope of my invention.

Having thus described my invention, what

I claim as new and desire to secure by Letters Patent, is:

1. In power transmission mechanism, in combination, a driving shaft, a driven shaft, oscillatable means carried by one shaft, means whereby coaxial relationship between the oscillatable means and the other shaft will allow independent rotation of the two shafts, means whereby non-coaxial relationship between the oscillatable means and the other shaft will cause the rotation of the driving shaft to rotate the driven shaft, means whereby energy transmitted to the driving shaft will be stored during the rotation of the driving shaft, means whereby the thus stored energy will revolve the driven shaft in a reverse direction from that of the driving shaft and braking means for limiting the rotation of the driven shaft in a predetermined direction.

2. In power transmission mechanism, in combination, a driving shaft, a driven shaft, an oscillatable member carried by the driving shaft, connecting means between the driven shaft and the oscillatable member whereby their non-coaxial position will cause the rotation of the driving shaft to rotate the driven shaft, means whereby the coaxial position of the oscillatable member and the driven shaft will allow of independent driven shaft and driving shaft rotation, means whereby energy transmitted to the driving shaft will be stored during the rotation of the driving shaft, means whereby the thus stored energy will revolve the driven shaft in a reverse direction from that of the driving shaft and braking means carried by the driven shaft limiting its rotation in a predetermined direction.

3. In power transmission mechanism, in combination, a driving shaft, a driven shaft in alignment with the driving shaft, an oscillatable member carried by the driving shaft, connecting means between the driven shaft and the oscillatable member whereby their non-coaxial position will cause the rotation of the driving shaft to rotate the driven shaft, means whereby the coaxial position of the oscillatable member and the driven shaft will allow of independent driven shaft and driving shaft rotation, means whereby energy transmitted to the driving shaft will be stored during the rotation of the driving shaft, means whereby the thus stored energy will revolve the driven shaft in a reverse direction from that of the driving shaft and braking means carried by the driven shaft limiting its rotation in a predetermined direction.

4. In power transmission mechanism, in combination, a driving shaft, a driven shaft, oscillatable means carried by one shaft, means whereby coaxial relationship between the oscillatable means and the other shaft will allow independent rotation of the two shafts, means whereby non-coaxial relationship between the oscillatable means and the other shaft will cause the rotation of the driving shaft to rotate the driven shaft, means whereby energy transmitted to the driving shaft will be stored during the rotation of the driving shaft, means whereby the thus stored energy will revolve the driven shaft in a reverse direction from that of the driving shaft and braking means whereby the driven shaft may revolve in both directions and may be prevented from rotation in either direction.

5. In power transmission mechanism, in combination, a driving shaft, a driven shaft, oscillatable means carried by one shaft, means whereby coaxial relationship between the oscillatable means and the other shaft will allow independent rotation of the two shafts, means whereby non-coaxial relationship between the oscillatable means and the other shaft will cause the rotation of the driving shaft to rotate the driven shaft, means whereby energy transmitted to the driving shaft will be stored during the rotation of the driving shaft, means whereby the thus stored energy will revolve the driven shaft in a reverse direction from that of the driving shaft and braking means whereby the driven shaft will revolve in the reverse direction to the rotation of the driving shaft.

6. In power transmission mechanism, in combination, a driving shaft, a driven shaft, an oscillatable member carried by the driving shaft, connecting means between the driven shaft and the oscillatable member whereby their non-coaxial position will cause the rotation of the driving shaft to rotate the driven shaft, means whereby the coaxial position of the oscillatable member and the driven shaft will allow of independent driven shaft and driving shaft rotation, means whereby energy transmitted to the driving shaft will be stored during the rotation of the driving shaft, means whereby the thus stored energy will revolve the driven shaft in a reverse direction from that of the driving shaft and braking means carried by the driven shaft which will cause it to revolve in the reverse direction to the rotation of the driving shaft.

7. In power transmission mechanism, in combination, a driving shaft, a driven shaft, an oscillatable member carried by the driving shaft, connecting means between the driven shaft and the oscillatable member whereby their non-coaxial position will cause the rotation of the driving shaft to rotate the driven shaft, means whereby the coaxial position of the oscillatable member and the driven shaft will allow of independent driven shaft and driving shaft rotation, means whereby energy transmitted to the driving shaft will be stored during the rotation of the driving shaft, means whereby the thus stored energy will revolve the driven shaft in a reverse direction from that of the driving shaft and movable means which in its several positions will allow the driven shaft to revolve in both directions, will allow the rotation of the driven shaft in but one direction and will allow the rotation of the driven shaft in the reverse direction to the rotation of the driving shaft.

8. In power transmission mechanism, in combination, a driving shaft, a driven shaft, oscillatable means carried by one shaft, means whereby coaxial relationship between the oscillatable means and the other shaft will allow independent rotation of the two shafts, means whereby non-coaxial relationship between the oscillatable means and the other shaft will cause the rotation of the driving shaft to rotate the driven shaft, means whereby energy transmitted to the driving shaft will be stored during the rotation of the driving shaft, means whereby the thus stored energy will revolve the driven shaft in a reverse direction from that of the driving shaft, means rotatable with the driven shaft and braking means coacting with the rotatable means capable of preventing the rotation of the driven shaft in one direction.

9. In power transmission mechanism, in combination, a driving shaft, a driven shaft, oscillatable means carried by one shaft, means whereby the coaxial relationship between the oscillatable means and the other shaft will allow independent rotation of the two shafts, means whereby non-coaxial relationship between the oscillatable means and the other shaft will cause the rotation of the driving shaft to rotate the driven shaft, means whereby energy transmitted to the driving shaft will be stored during the rotation of the driving shaft, means whereby the thus stored energy will revolve the driven shaft in a reverse direction from that of the driving shaft, a member having a jaw opening therein and an annular member carried by the driven member revoluble through the jaw opening in only one direction.

10. In power transmission mechanism, in combination, a driving shaft, a driven shaft, oscillatable means carried by one shaft, means whereby coaxial relationship between the oscillatable means and the other shaft will allow independent rotation of the two shafts, means whereby non-coaxial relationship between the oscillatable means, and the other shaft will cause the rotation of the driving shaft to rotate the driven shaft, an annular member carried by the driven member and rotatable through the jaws of a movable member and a movable member having jaws through which the annular member may rotate in only one direction, in both directions, or in reverse movement to the driving shaft dependent upon the relationship between the annular member and the faces of the jaws.

Signed at the city of New York, in the county of New York and State of New York, this 7th day of Sept., A. D. 1920.

HARRY A. RHODES.